Sept. 19, 1961 H. RUDOLPH 3,001,016

TELEPRINTER SIGNAL TRANSMISSION APPARATUS

Filed March 26, 1959 2 Sheets-Sheet 1

Inventor:
HANS RUDOLPH

By Toulmin & Toulmin
Attorneys

Sept. 19, 1961 H. RUDOLPH 3,001,016

TELEPRINTER SIGNAL TRANSMISSION APPARATUS

Filed March 26, 1959 2 Sheets-Sheet 2

Inventor:
HANS RUDOLPH

By Toulmin & Toulmin
Attorneys

United States Patent Office 3,001,016

Patented Sept. 19, 1961

3,001,016
TELEPRINTER SIGNAL TRANSMISSION APPARATUS

Hans Rudolph, Munich-Solln, Germany, assignor to Siemens & Halske Aktiengesellschaft, Berlin, Germany, a German company Filed Mar. 26, 1959, Ser. No. 802,250
Claims priority, application Germany Apr. 2, 1958
10 Claims. (Cl. 178—17.5)

This invention relates to teleprinter signal transmission apparatus and is concerned with simplified and improved storage means for characters which have been converted from a first to a second teleprinter code.

When teleprinter signals are transmitted over transmission paths which are liable to interference, in particular over radio paths, special precautions are often taken to keep the number of transmission errors caused by interference as low as possible. For this purpose a protective or error-detecting code is used and the apparatus may be designed to provide correction of mutilated signals by means of automatic repetition.

The protective code normally used is a seven-unit code in which each character consists of three spaces and four marks, or vice versa, and, as teleprinter apparatus normally operates with a five-unit code (for example the international telegraph alphabet No. 2), a code converter must be provided to convert teleprinter signals in the five-unit code to corresponding signals in the seven-unit code. Automatic error correction is particularly applicable to transmission systems having a large capacity and accordingly the invention will be described with reference to a multiplex system having at least two channels. In such systems a pulse distributor is provided which, at the transmitter, serves both to interleave the signals belonging to the different channels and also to control the conversion of the individual character combinations from the parallel to the sequential form.

If the character combinations are applied to the apparatus in time sequence, these combinations may be stored in a series-parallel-converter and fed from there into a code converter.

Before a detailed description of apparatus according to the invention is given, the principle of operation of the whole transmission system will be explained below so far as it appears to be necessary and advisable for the understanding of the invention.

The system to be described serves for the simultaneous transmission of two or more teleprinter messages according to the time-multiplex principle. The system will be based on a two-channel system, but it will be obvious that such a system can be extended easily to three, four or even more channels.

As it would be a disadvantage to employ special signal transmitters and receivers for teleprinter connections which require special protection against transmission errors and which are suited directly, for example, for the seven-unit code, the transmission systems intended for this purpose are provided with code converters. In the terminal equipment and in feeder lines, if any, the normal five-unit code is used, and each signal of the five-unit code is translated into a corresponding signal of the seven-unit code by means of a (5/7)-code converter before it is sent over the path that is liable to interference. At the end of this path each of the signals that are received without mutilation is retranslated into the corresponding signal of the five-unit code by means of a (7/5)-code converter and fed into the receiver.

The receiver includes means for counting the number of space or mark elements in each seven-unit code signal received. If the space to mark ratio is 3:4 the respective signal is accepted as being undistorted. If there is a deviation from this 3:4 ratio, mutilation of the signal must have occurred; the receiving apparatus orders the transmitter of its own station (for instance by means of a voltage pulse) to send to the distant station a request for a repetition. The repetition-request signal consists of a combination of the seven-unit code of the same type as is used for characters (namely, also having a space to mark ratio of 3:4) and is called hereinafter an RQ signal.

There are altogether 32 different combinations in the five-unit code and a similar number of combinations must be used in the seven-unit code. During a pause in a message, a circuit being operated with a five-unit code is kept in the condition of continuous space current; when a clearing signal is required the condition is changed to continuous mark current. These two continuous states must be translated in a time-multiplex transmission system in the form of seven-unit code signals with a space to mark ratio of 3:4 because any other form of signal would be regarded by the receiver as a mutilated signal and would give rise to a condition of continuous sending of RQ signals. The seven-unit code combination provided for the transmission of the continuous mark state is usually denoted by $\alpha$ and that for the continuous space state by $\beta$. As a total of 35 seven-unit code combinations with a space to mark ratio of 3:4 are available, one combination is left for the RQ signal.

The present invention will now be more particularly described with reference to the accompanying drawings, in which.

Figure 1:
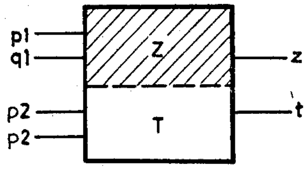
FIGURE 1 illustrates diagrammatically a bi-stable multivibrator circuit constructed in known manner.
Figure 3:
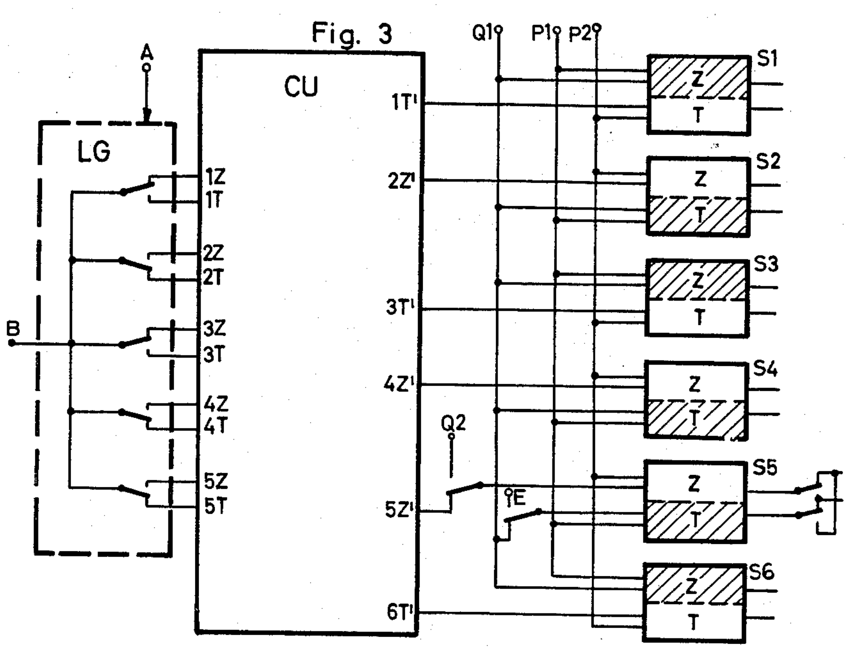
FIGURES 3 and 4 are block diagrams similar to that of FIGURE 1 showing alternative embodiments of the present invention.
Figure 4:
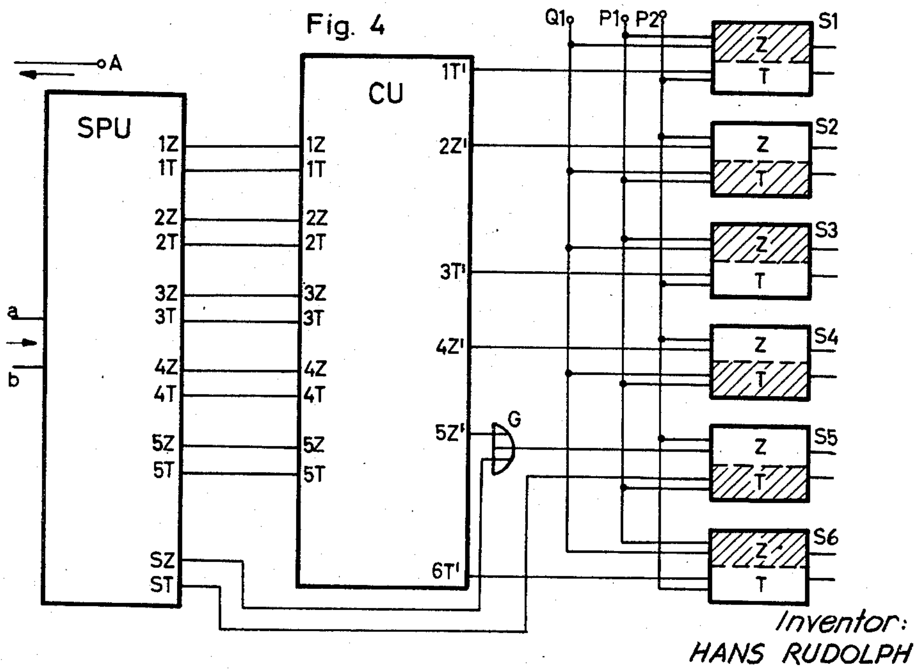

Referring firstly to FIGURE 1, a bi-stable multivibrator is illustrated which has four input terminals and two output terminals. Such a multivibrator circuit is described in detail in U.S. specification No. 2,580,771 (Harper), issued January 1, 1952. If the multivibrator is set in the state Z (cross-hatched and representing the mark state) a high voltage appears at the output terminal $z$, the line to earth having been omitted. There is then on the output terminal $t$ either no voltage at all or a voltage considerably smaller than that appearing on $z$. In order to switch the multivibrator to the space state T, $q_2$ must be supplied with a voltage and $p_2$ with a pulse whereupon an output voltage (to earth) appears on the terminal $t$ and the voltage at $z$ disappears. Restoration of the multivibrator to the mark state Z is achieved in the converse manner. The manner of representation of the arrangement of the input and output terminals in FIGURES 2, 3 and 4, is the same for all multivibrators so that in the description following the notation of the terminals can be omitted.

The multivibrators are used as store elements in the embodiments hereinafter described. However, it will be appreciated that the individual elements of a store can consist of vacuum tubes (for example, double triodes); gas discharge tubes (for example, thyratrons, neons) with hot or cold cathodes; transistors; ferroelectric components or magnetic cores with rectangular hysteresis loop; components which make use of the Hall effect; and electro-mechanical contact relays or others.

Figure 2:
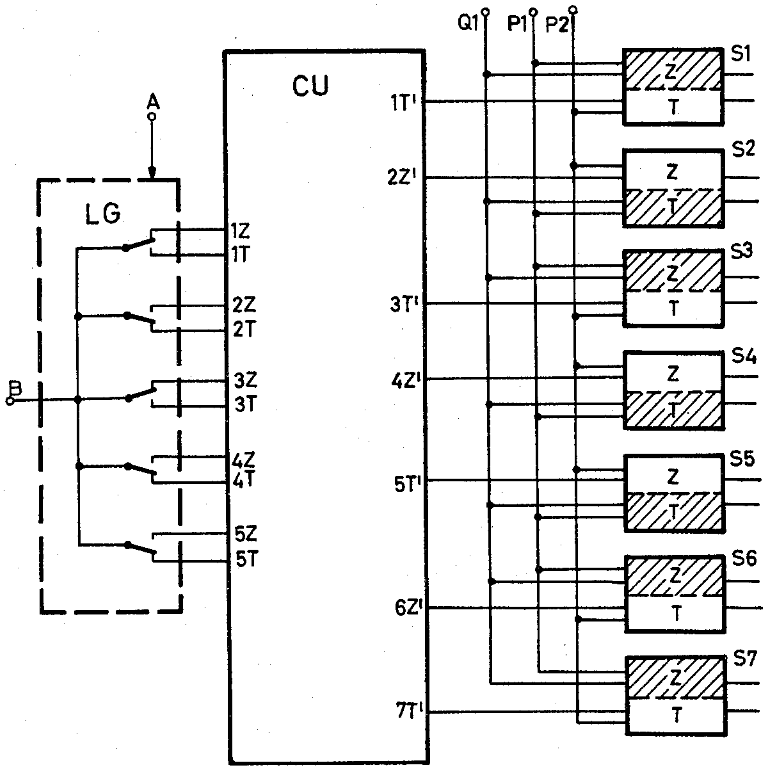
FIGURE 2 is a block diagram showing the tape-reading machine, code converter and store of the transmitting apparatus according to one embodiment of the present invention.

Referring now to FIGURE 2, a simple telegram transmission is to be assumed, in the transmission pauses of which the condition of continuous space current will obtain; in this case, the condition of the continuous mark current can be omitted. It is further assumed that the message to be transmitted is already present on tape and recorded in the five-unit code. In a tape machine LG one row of holes is scanned at a time and five switch contacts are set correspondingly. Switching-over to the next following row of holes is triggered off by a trigger pulse which is applied to the terminal A and which is controlled from the repetition arrangement of the multiplex apparatus. A certain voltage applied to point B is passed on through the switch contacts of the tape machine to the series of input terminals 1Z and 1T to 5Z and 5T of a code converter CU. A series of store elements S1 to S7 are controlled through seven output lines corresponding to the individual units of the seven-unit code, the said converter output lines being connected to the store elements S1 to S7 in a manner hereinafter explained. Since the code converter CU has only one output terminal per unit of the seven-unit code (double output terminals, one each for the space and mark polarity of each unit would increase the expense of the code converter excessively), the seven store elements are set to a rest state prior to each new storage of a combination. Thus, in FIGURE 2, the rest state of the store as a whole is shown, the individual elements S1 to S7 being in the state shown by shading or cross-hatching. It will be noted that the combination chosen for the rest states of the individual elements S1 to S7, respectively, is ZTZTTZZ which corresponds to the idle signal $\beta$ in the seven-unit code which is the continuous space current condition of the store. As stated above, the individual elements S1 to S7 are set to this condition prior to the storage therein of each new combination by applying simultaneously a voltage to the terminal $Q_1$ and a pulse to the terminal P1 and through the leads to all store elements.

According to a further aspect of the present invention the code converter CU is so constructed that, assuming the store is in its rest state and assuming that it is desired to record a character in the store preparatory to transmission thereof, a voltage appears only at those of the seven output terminals the respective pulse polarity of which is opposite to that of the associated one of the store elements S1 to S7. Thus the switch contacts of the tape machine are set to the five-unit combination ZTZTT corresponding to the letter G of the five-unit international telegraph alphabet No. 2. The rest state of the store, as stated above, is ZTZTTZZ and the seven-unit code combination for the letter G is TTZZZZT. If these are written one under the other, thus:

ZTZTTZZ
TTZZZZT it will be seen that the store elements S1, S4, S5 and S7 must be set to the other state thereof:

S1 from mark to space
S2 remains at space
S3 remains at mark
S4 from space to mark
S5 from space to mark
S6 remains at mark
S7 from mark to space.

In order to carry out this translation, the code converter CU must deliver a sufficiently high voltage at its output terminals 1T', 4Z', 5T' and 7T to effect the desired alterations of state, whereas there is either no voltage or only a small voltage at the terminals 2Z', 3T' and 6Z' which is not effective to alter the rest states of elements S2, S3 and S6. The transfer of the seven-unit code combination of the letter G into the store arrangement is carried out by a pulse fed through P2.

With the arrangement according to the invention a predetermined constant combination (representing either continuous space current or continuous mark current) can, therefore, be ensured which becomes effective during any pauses in transmission practically without any special expense simply by suppressing the pulse at the terminal P2 so that there is always available for transmission, in the form of sequential pulses following each other, in time, a seven-unit code combination which corresponds to the rest state of the store, namely, idle signal $\beta$ in FIGURE 2.

Referring to FIGURE 3, the apparatus comprises, in the main, the same integers as are illustrated in FIGURE 2. However, only the first six units of each seven-unit combination need be formed and, therefore, there are only six store elements S1 to S6. The apparatus comprises means for counting the number of spacing pulses in a read-out combination which was stored in the elements S1 to S6 and means controlled by said counting means for adding a further pulse to said pulse combination to produce a predetermined space to mark ratio. Further, a pair of switch contacts are arranged in the lead connecting the converter output 5Z' to one half of the element S5 and in the lead connecting the input terminal Q1 to the other half of the element S5. Again, a change-over contact arrangement is included in the output leads of the element S5. In practice only one of these contact arrangements is required as the same purpose can be fulfilled with each of them. The translation process from the five-unit code to the seven-unit code takes place in the same way as has already been described with reference to FIGURE 2. If the clearing signal is to be given when message transmission has been finished all that is necessary is to alter the rest state of the store element S5. This is so because the seven-unit code combinations for idle signals $\alpha$ and $\beta$ differ from one another only as regards the fifth pulse if the seventh pulse is disregarded. Thus, in FIGURE 3, the rest state of the store is ZTZTTZ which corresponds to the first six pulses of the combination corresponding to idle signal $\beta$. If store element S5 alone is set to its other stable state the store condition is ZTZTZZ which corresponds to the idle signal $\alpha$. This is done by means of a stop key which changes over the contacts illustrated as lying between the code converter CU and the store and by applying thereafter to the terminal Q2 a potential of magnitude such that the store element S5 is converted from the T state to the Z state thereof without the simultaneous application also of a pulse to the terminal P2. However, the operation may also be achieved in the normal way as well. The voltage input of the space side of S5 is interrupted at the same time or is connected to earth potential (terminal E) in order to prevent accidental switch-back of the store element S5 to the space condition thereof.

Instead of switching the store element S5 it is also sufficient simply to cross its two output leads and it will be obvious that in place of the mechanical contacts electronic switches can be used with the same result.

FIGURE 4 shows, in a block diagram, an alternative mode of application of the present invention for the case in which the signal transmission is made by a subscriber who is a very long distance away. It will be obvious that, in such a case, a great number of direct connecting lines between the tape reading machine LG and the code converter CU (as in FIGURE 3) would be uneconomical; a signal transmitter, for instance a tape reading machine, will be provided at the subscriber, which machine delivers the units of the five-unit code including the start and stop pulse in series, that is, in time sequence. The signals arriving via the double lines *a*, *b* are applied at first to a series-parallel converter SPU (series, input, parallel output of the pulse combinations), which stores the individual pulse polarities and passes them on separately through a corresponding number of connecting lines (1Z and 1T to 5Z and 5T) to the code converter CU. Apart from the stores for the five pulses of the combination, and any other required devices, the series-parallel converter also has a store which is capable of storing the space pulse polarity. The output terminals SZ and ST of this store (which is not shown in detail) are connected to two inputs of the store element S5.

Thus, output terminal ST is connected to the input terminal of the space side of element S5 and the output terminal SZ is connected to one input terminal of an OR element G, the other input terminal of which is connected to the output terminal 5Z' of the code converter CU. The output of the OR element G is connected to the input of the mark side of the element S5. As long as the subscriber delivers continuous space current or sends a message a high voltage is present at the output terminal ST at least at the decisive moment, that is, at the instant when a pulse arrives via P1, whereas the output terminal SZ is at earth potential. As is apparent from FIGURE 3, the store as a whole is in its rest state corresponding to the idle signal $\beta$ to which it is set before the storage of each new signal combination. If the subscriber starts to transmit continuous mark pulse combination, the series-parallel converter can recognise this, starting from the instant when switching occurs from space to mark condition, only at that instant at which the space pulse combination would normally arrive, which means approximately 130 milli-seconds delay at the usual teleprinter writing speed. The space pulse combination store in the series-parallel converter switches over to the mark side so that a high voltage appears at SZ and earth potential at ST. The high voltage at the output terminal SZ is applied to one input of the OR element and the output of the OR element applies potential to the input of the mark side of the element S5. When a pulse is applied via terminal P2 to the mark side of the element S5, the said element S5 is charged to the mark condition. Thus, the rest state of the store ZTZTTZ corresponding to the idle signal $\beta$ (again ignoring the seventh pulse of the combination) is altered to ZTZTZZ corresponding to the idle signal $\alpha$ (continuous mark current).

The arrangement according to the invention can be varied in different ways. In particular, when a channel of a multiplex system is subdivided into subchannels (for instance two) the significance of the combinations $\alpha$ and $\beta$ can be as described above in one subchannel and the opposite in the other subchannel. Accordingly, the fundamental state of the store arrangement in the latter subchannel will then correspond to the idle signal $\alpha$ and the construction of the code converter CU is correspondingly altered.

The code converter and store arrangement may be interwoven in such a way that there is not any clear constructional demarcation line between them. This is advantageous when active switching elements, for example, valves or transistors, are used both in the code converter and in the store.

It is possible to simply the equipment by reducing the size of the store to six store elements S1 to S6 (FIGURES 3 and 4) because the space to mark ratio in the seven-unit code combination is predetermined and because the seventh pulse (mark or space, whichever is required to establish the correct ratio) of the combination is added in known manner before the pulse combination is sent.

What I claim as my invention and desire to secure by Letters Patent of the United States is:

1. Teleprinter signal transmission apparatus comprising a tape-reading machine for reading a tape on which is recorded a pulse combination in accordance with a first teleprinter code, said machine including a plurality of switching means which are settable to reproduce said combination, a code converter for translating teleprinter signals from said first teleprinter code to a second teleprinter code under the control of said machine, the input and output of said code converter being connected to the output of said machine and the input of a storage means, respectively, the storage means consisting of a plurality of elements each of which has two stable states of which one is the rest state thereof, the rest state of the storage means corresponding to a combination of teleprinter signals of said second teleprinter code.

2. Teleprinter signal transmission apparatus as claimed in claim 1, wherein the combination of teleprinter signals manifested by the storage means in the rest state thereof is an idle signal.

3. Teleprinter signal transmission apparatus as claimed in claim 2, wherein the idle signal has a composition allotted to the character $\beta$ in the International Telegraph 7-unit-code.

4. Teleprinter signal transmission apparatus as claimed in claim 2, wherein the idle signal has a composition allotted to the character $\alpha$ in the International Telegraph 7-unit-code.

5. Teleprinter signal transmission apparatus comprising a code converter for translating characters from a first teleprinter code to a second teleprinter code, a storage means comprising a plurality of storage elements of which each has two stable states, connecting paths between said code converter and said storage means, means for inserting a plurality of pulses representing an idle signal in said storage means before a plurality of pulses representing a character is inserted therein, a pulse generator controlling the paths between said code converter and said storage means, said converter being operable to prepare a minimum number (including one) of connecting paths between itself and a number (including one) of said storage elements in order that the state of the said number of storage elements may be altered to store a different character in the storage means.

6. Teleprinter signal transmission apparatus comprising a code converter, a six-unit storage means comprising a plurality of storage elements of which each has two stable states, connecting paths between said code converter and said storage means, means for inserting a plurality of pulses representing an idle signal of one type in said storage means after the transmission of each character and means operable to insert a plurality of pulses representing an idle signal of another type by altering the state of one storage element.

7. Teleprinter signal transmission apparatus as claimed in claim 6, wherein said means operable to insert the pulses representing the idle signal of the other type include a pair of switch contacts, one contact being inserted in the connecting path between said code converter and said one storage element and the other contact being inserted in the circuit (unique to said one storage element) which forms a part of said means for inserting the pulses representing the idle signal of the one type.

8. Teleprinter signal transmission apparatus comprising a code converter, a six-unit storage means comprising a plurality of storage elements of which each has two stable states, connecting paths between said code converter and said storage means, means for inserting a plurality of pulses representing an idle signal of one type in said storage means after the transmission of each character and a pair of switch contacts connected in output leads of one of the storage elements and operable to change the signal transmitted from that storage element from a signal representing one state to a signal representing the other state.

9. Teleprinter signal transmission apparatus as claimed in claim 6, wherein said code converter is preceded by a series-parallel converter, of which two output terminals are connected direct to one of the input terminals of each pair of terminals of said one storage element.

10. Teleprinter signal transmission apparatus as claimed in claim 9, wherein one output terminal is connected to the mark side of said one storage element and the other is connected to the space side thereof via an OR element.

References Cited in the file of this patent

UNITED STATES PATENTS

| | | |
|---|---|---|
| 2,716,156 | Harris | Aug. 23, 1955 |
| 2,744,955 | Canfora | May 8, 1956 |
| 2,832,063 | McMillan | Apr. 22, 1958 |